(No Model.)

P. JORDAN.
GAGE KNIFE.

No. 343,522.  Patented June 8, 1886.

WITNESSES
John Becker
Jno. E. Gavin

INVENTOR
Peter Jordan
by Chas. M. Higgins.
Attorney

UNITED STATES PATENT OFFICE.

PETER JORDAN, OF BROOKLYN, NEW YORK.

GAGE-KNIFE.

SPECIFICATION forming part of Letters Patent No. 343,522, dated June 8, 1886.

Application filed October 24, 1885. Serial No. 180,830. (No model.)

*To all whom it may concern:*

Be it known that I, PETER JORDAN, of Brooklyn, Kings county, New York, have invented certain new and useful Improvements in Paring-Tools, of which the following is a specification.

My invention aims more especially to provide an improved tool for paring or peeling fruits and vegetables—such as apples and potatoes—which may be held in the hand and act to remove the peels in a uniform rapid manner without waste of material or any special care or effort on the part of the operator.

To this end my invention may be briefly stated to consist in the combination, with a supporting-handle, of a cutter made on the principle of a plane with a dull bearing-edge in advance followed by a sharp cutting-edge, with a slot between the two for the escape of the parings, the said double-edged and slotted blade being pivoted on said handle on a longitudinal axis, and thus left free to fit flatwise on the periphery of the article to be peeled, and adapt itself to the different curves or irregularities in its surface as the peeling advances, whereby a perfectly uniform peel is produced without effort of the operator and without regard to irregularities of surface. I prefer to make this pivoted cutter in the form of a flat blade pivoted longitudinally at the middle, and having its outer edges dull to act as the advance bearing or guiding edges, but having a longitudinal slot along the middle between its pivot-points, and the edges of said slot upturned in opposite directions and sharpened to form projecting cutting-edges. In this way a double-acting blade is formed, which will act on whichever side happens to strike the fruit or vegetable first, and thus require no care or attention in applying the tool to its work.

Figure 1:
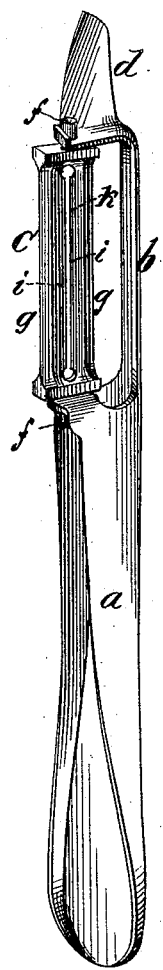
Figure 2:
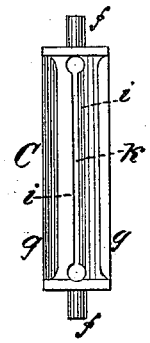
Figure 3:
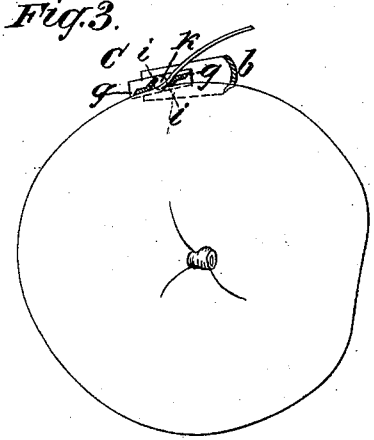

In the drawings annexed, Figure 1 represents a perspective view of my improved paring-tool. Fig. 2 is a view of the cutter removed. Fig. 3 shows a cross-section of the tool through the cutter when in action.

In Fig. 1, *a* indicates the grasping-handle of the tool, formed in any suitable shape adapted to be held in the hand. This handle may be formed of any suitable material; but I prefer to stamp it up in a flanged shape from sheet metal, as represented, which will render it strong, light, and cheap. The handle is formed with a recess or crank, *b*, just above the grasping portion, in which the cutter C is pivoted, and this cranked part terminates with a curved and pointed blade or scraper, *d*, adapted to gouge or scrape out the eyes of potatoes.

The cutter C is preferably a flat piece or blade of sheet-steel having little trunnions *f f* at each end in line with the longitudinal center of the cutter, which trunnions are received in socket-holes in the front ends of the cranked part, as fully shown in Fig. 1, thus pivoting the blade freely in the said crank or recess *b*. The outer edges, *g g*, of this blade are dull and round, (see Figs. 2 and 3,) while the middle of the blade is divided by a longitudinal slot, *k*, which runs nearly from end to end between the trunnions, and each edge of this slot is bent or turned outward, and is ground to present sharp projecting edges *i i*.

The general construction having been now explained the action will be readily understood. Thus when the tool is grasped by the handle and applied to the fruit or vegetable, as indicated in Fig. 3, so that the blade rests on the periphery thereof, the blade, being flat and freely pivoted, will of course at once adapt itself to the surface, as shown. When the tool is therefore pressed against the surface and moved forward with the usual peeling motion, the advancing dull edge *g* will bear upon the peel in advance of the cutting-edge, and will thus guide the cutting-edge to its work and determine the depth of cut, so that the cutter thus acts on the principle of a spokeshave or plane, and will thus cut into the fruit to a limited uniform depth, and thereby remove a uniform peel in a continuous manner without waste and with an easy and rapid manipulation, which renders the tool very efficient and facile. As the plane-like blade is freely pivoted, it will of course conform to all the curves of the fruit or vegetable and travel over all the irregularities, keeping the same relative angle of presentation, and thereby removing a uniform peel at all points without any guiding effort on the part of the operator, which is a most desirable advantage. It will be further seen that as the blade is double, by reason of the cutting-edges *i i* on opposite sides, the tool will act at once, whichever side is applied to the fruit, and as the blade is flat and freely pivoted, the blade cannot therefore be applied wrongly to its work, but will assume without effort its correct position when applied to the surface of the fruit or vegetable, as will be readily appreciated on reference to Figs. 1 and 3, which is an important advantage of the construction described. It is of course not necessary that the blade be made double, as described, as it may have but a single cutting and bearing edge; but it is obvious that the duplex form shown is greatly preferable.

I am aware that a vegetable-peeler has been made with a pivoted knife-blade set up close to a fixed parallel shaft or bar, the peel passing between the edge of the pivoted plate and the fixed bar, as in Patent No. 242,185; but this is quite distinct from my invention, in which the bearing or guiding edge and the cutting-edge and the paring-slot are all in the same pivoted plate, which rests flatly and directly on the article to be peeled. In the patent referred to the thickness of the peel is determined by the distance of the cutting-edge of the blade from the fixed bar, whereas in my case the thickness is determined by the angle of the cutting-edge on the pivoted slotted plate; and the general action of the blade is distinct from that referred to, and is of such nature that, while being very direct, simple, and efficient in its workings, it is not likely to clog with parings, which are delivered at a free open slot, instead of through a close slit between the edge of a pivoted blade and a fixed bar.

What I claim is—

1. In a paring-tool, the combination, with a grasping-handle, of a cutter-blade made on the principle of a plane with a dull bearing-edge in advance, followed by a sharp cutting-edge, with an intervening paring slot or space, the said blade being pivoted freely on said handle on a longitudinal axis, substantially as shown and described.

2. A paring-tool having a grasping-handle formed with a recess or cranked part, b, and a plane-like blade or cutter having a dull bearing-edge in advance, a cutting-edge in the rear, and an intervening paring-slot pivoted in said recess on a longitudinal axis, substantially as shown.

3. In a paring-tool, a cutter formed of a flat pivoted blade having a central slot, k, and a cutting-edge, i, formed on one edge of said slot and dull outer bearing edge or edges, g, substantially as shown and described.

4. In a paring-tool, a cutter formed of a flat blade having longitudinal central pivots, a longitudinal slot between said pivots, cutting-edges i i on the sides of said slot, and outer dull or bearing edges, g g, substantially as shown and described.

5. A paring-tool formed by the combination, with a grasping-handle, of the blade C, pivoted on a longitudinal axis thereon and formed with the slotted center k, cutting-edges i i, and dull outer edges, g g, substantially as and for the purpose set forth.

PETER JORDAN.

Witnesses:
  CHAS. M. HIGGINS,
  JOHN MAGREE.